United States Patent
Hoglund et al.

(12)

(10) Patent No.: US 6,237,204 B1
(45) Date of Patent: May 29, 2001

(54) PRODUCTION OF TUBES

(75) Inventors: Goran Hoglund, Bjasta; Bo Lindstrom, Sjalevad; Kerstin Sjostrom; Soren Soderberg, both of Ornskoldsvik, all of (SE)

(73) Assignee: SLX Hydraulic AB, Ornskoldsvik (SE)

( * ) Notice: Subject to any disclaimer, the term of this patent is extended or adjusted under 35 U.S.C. 154(b) by 0 days.

(21) Appl. No.: 09/171,976

(22) PCT Filed: Dec. 12, 1996

(86) PCT No.: PCT/SE96/01645

§ 371 Date: Nov. 12, 1998

§ 102(e) Date: Nov. 12, 1998

(87) PCT Pub. No.: WO97/41380

PCT Pub. Date: Nov. 6, 1997

(30) Foreign Application Priority Data

Apr. 29, 1996 (SE) .................................... 9601634

(51) Int. Cl.⁷ ............................. B23P 21/00; B21D 39/00
(52) U.S. Cl. .......................... 29/33 D; 29/33 K; 29/33 T; 29/237; 29/781
(58) Field of Search .................................. 29/33 T, 33 D, 29/705, 33 K, 781, 796, 795, 237

(56) References Cited

U.S. PATENT DOCUMENTS 3,874,048 * 4/1975 Millar et al. ...................... 29/33 K
4,262,408 * 4/1981 Johnson et al. .................. 29/33 T X
4,467,508 * 8/1984 Fjällström ............................ 29/33 T
4,945,632 * 8/1990 Alman et al. .......................... 29/781
5,113,557 * 5/1992 Maitra et al. ........................ 29/33 D

FOREIGN PATENT DOCUMENTS 21 04 744 8/1972 (DE) .
5-87281 * 4/1993 (JP) ..................................... 29/33 K
6-155194 * 6/1994 (JP) ..................................... 29/33 D

* cited by examiner

Primary Examiner—William Briggs
(74) Attorney, Agent, or Firm—Young & Thompson

(57) ABSTRACT

The invention relates to a machine for producing a tube provided with a nipple in each end controlled by a process-computer. The machine comprises a plurality of stations where machining of the tube shall be made, the tube primary product being rolled up on a roll which is arranged in a tube roll stand. According to the invention, the machine includes transport of the tube to and from respective stations wherein the tube is fed from the roll up to a measuring and cutting station, where the tube is measured to selected length and is cut off by a cutting tool; the tube is taken to a nipple connecting station, where the two ends of the tube are equipped with a nipple provided with a sleeve, which nipples, if necessary, are also marked; the tube is further taken to a pressing station, where a pressing unit presses the nipples to a fixed position on the tube; the machined tube is throughly cleaned by blowing and is finally controlled and/or tested, whereafter the tube is ready for wrapping.

4 Claims, 2 Drawing Sheets

PRODUCTION OF TUBES

This invention relates to a method of producing a tube, for instance a hydraulic tube. provided with a nipple in each end, by means of a machine controlled by a process-computer, which machine comprises a plurality of stations, where machining of the tube shall be made, the tube primary product being rolled up on a roll, which is arranged in a tube roll stand. For carrying out the method a completely new machine has been created, which accordingly also is an integral part of the invention.

According to known technique a tube of a certain dimension and length is today produced in a manual way. In this connection the tube is manually cut off. whereafter the tube ends are peeled and a nipple is put onto each tube end. Finally the tube is blown clean manually. This manual handling is very long-winded and time-consuming and has accordingly the consequence that the conventional handling when producing tubes becomes very ineffective.

This invention intends to make the handling for production of tubes more efficient and this has been made possible by a method and a machine according to the invention, which have The steps and features, mentioned in the claims.

Figure 1:
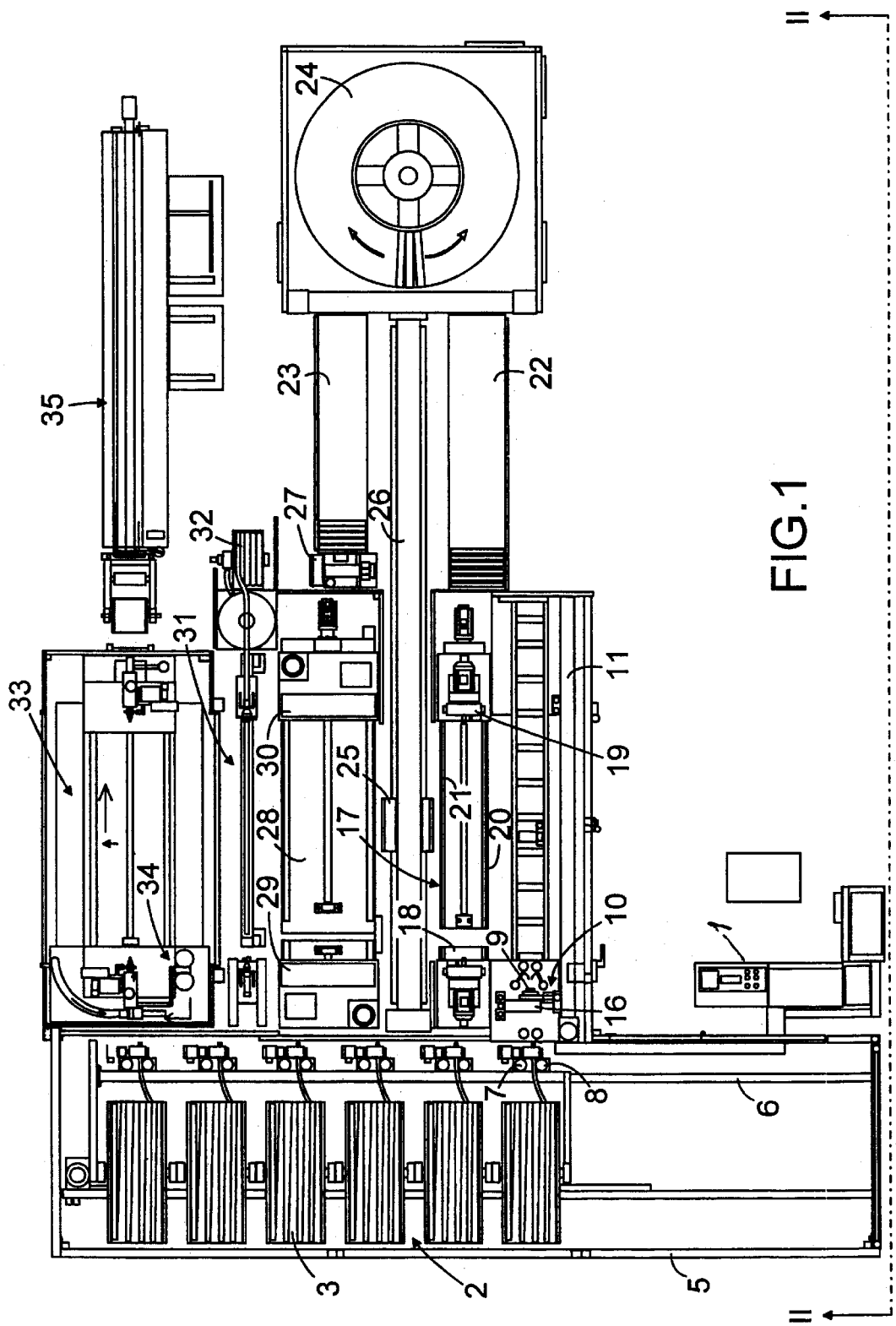
Figure 2:
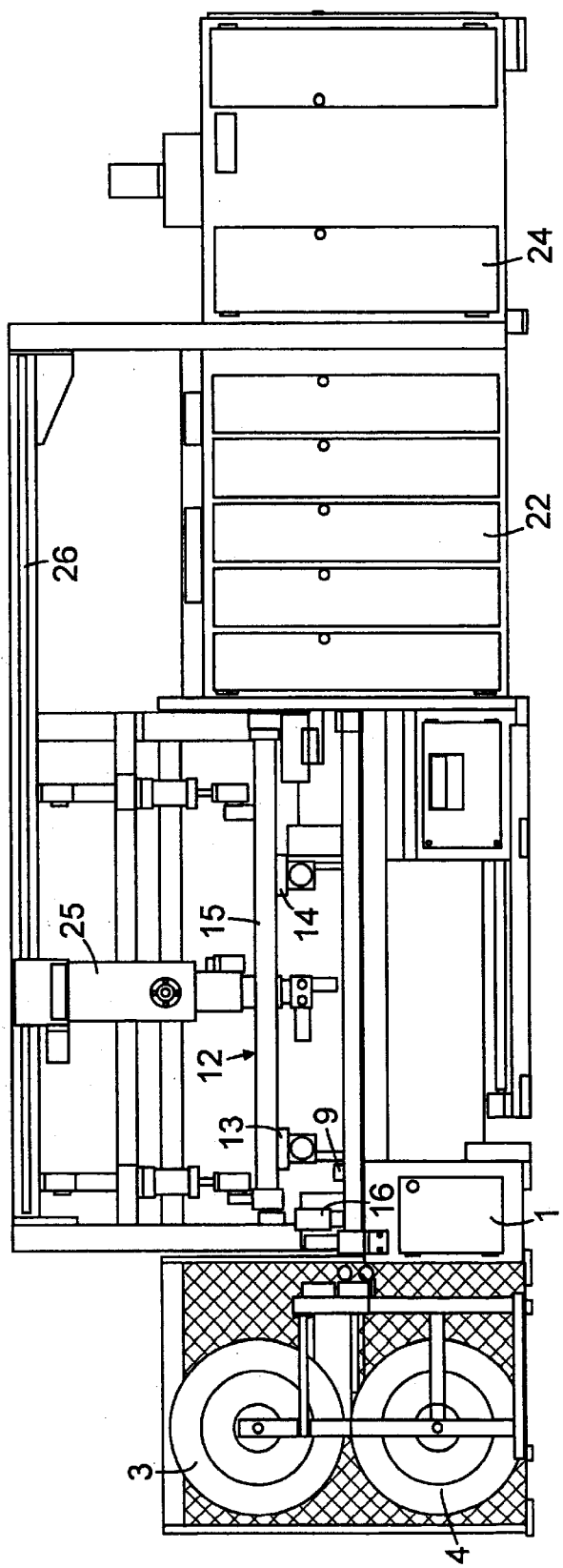

A preferred embodiment of the invention shall be described more closely with reference to the accompanying drawings, where FIG. 1 shows a plan view of the new machine, and FIG. 2 shows a side view of the machine, seen in the direction of the arrows II—II.

According to the invention the new machine comprises a programmable process-computer 1, which is intended to control all process-steps for production of the tube, so that the production is made completely automatically. In this connection the operator via a commanding desk gives the process-computer orders about tube dimension, tube length, nipple dimension, nipple angle and the number of tubes, whereafter the process-computer starts the machine and by that the tube production.

The new machine further comprises a tube roll stand 2, in which a plurality of rolls 3 with tubes of different dimensions are arranged. The number of tube rolls can of course be varied, but in order to spare space, the tube rolls 3 are arranged at two different levels, the tube rolls 3 at the higher level being positioned essentially straightly above the tube rolls 4 at the lower level. According to the invention one tube of only one and the same dimension is arranged on each tube roll 3, 4.

The tube roll stand 2 can move on guides 4, 6 and is laterally displaceable by means of a ball-roller-screw, driven by an electric stepping motor, so that the selected tube shall be able to be fined to two co-operating feeding rollers 7, 8, which are intended to draw the tube up to a stop pin 9, constituting a reference point during the tube measuring. This stop pin is movable in vertical direction so that the pin can be taken away downwards to an inactive position, when the tube shall be drawn out for measuring the tube length. This moment of drawing out the tube is made by a tube outdrawer 10, which is movably arranged on a guide 11 by means of known technique, for instance a ball-roller-screw, which is driven by an electric stepping motor, and which has a tongs-like means, which is intended to catch hold of the tube.

When the tube outdrawer 10 has reached its final point, determined by the process-computer 1, a tube carrier 12, provided with two holding means 13, 14, catches hold of the tube and holds this one in a steady grip. The inner holding means 13, i.e. the means which is positioned closest to the tube rolls 3, 4, has a fixed position and at such a distance from the tube end that there is space for pureing on a nipple with a sleeve belonging to it. The second holding means 14 is in a suitable way displaceably arranged on a bar 15, constituting a main means of the tube carrier, in order to be adapted to different tube lengths.

The mentioned tube carrier 12 is designed in that way that it can move both in vertical direction and in horizontal direction, which can be made due to the fact that the two ends of the tube carrier are forced to move on guides extending vertically and horizontally.

When The tube has been drawn out the predetermined measure, it is cut off with a tongs-like means 16. Cutting by means of the mentioned tool has appeared to be a better method than cutting by a saw-blade, because in the later case tube rests are created inside of the tube, which are difficult to get away.

After the cutting procedure the tube carrier lifts up the tube and moves it laterally to next station, where the two ends of the tube shall be peeled for good fitting to the nipple provided with a sleeve.

The peeling unit 17 comprises two separate peeling means 18, 19, of which the peeling means 18 constitutes the inner means and has a fixed position, whereas the outer peeling means 19 is movably arranged on rails or guides 20, 21 for adaptation to tubes of different lengths and different dimensions.

The peeling means are designed in that way with working means that during the rotation of these ones is made an effective working of the tube ends. The working means have such a design that they can be adapted to different tube dimensions.

From the peeling station the tube is taken by the tube-carrier, which is fastened to the tube right up to the end station, to a station where the two tube ends are equipped with nipples provided with sleeves. These nipples/sleeves are stored in different fixed magazines 22, 23 but can also be stored in rotating magazines 24.

These nipples provided with sleeves are intended to be fetched by a robot 25, which is controlled by commands given by the process-computer 1 in accordance to the instructions of the operator.

The robot 25, which is intended to move on a guide 26 or the like, firstly picks up a nipple provides with a sleeve for the first tube end, whereafter this nipple is marked in the marking means 27 and is taken to said tube end for putting it on the same. Thereafter the same thing is made with the nipple for the second tube end.

After having been equipped with nipples, the tube is taken by the tube carrier to a pressing unit 28, having two separate pressing means 29, 30, one for each tube end, where the nipples are fixed by pressing on the tube. The mentioned pressing unit 28 is of a kind known in the market.

After having undergone the pressing operation, the tube is moved by the tube carrier 12 to a unit 31 for cleaning by blowing. This unit 31 has a tube roll 32 emitting pressurised air, which medium blows the tube, produced according to the invention, free from tube rests and other impurities.

After cleaning by blowing the tube is taken by the tube carrier to a unit 33 for hydrostatic texts, where an oilbased medium with a pressure up to 1000 bar is sprayed into the tube.

By this measure, possible faults in the tube directly appear. The mentioned unit 33 also comprises a device 34 for final cleaning of the tube by flushing.

Finally the tube is taken by the tube carrier to a unit 35, where the tube shall be wrapped in the form of coating with plastic and thereafter labeling.

According to the invention preferably the different machining stations are designed like modules, a certain module being able to be eliminated if that would be desirable.

Thus, the measuring and cutting station constitutes a first module, the peeling station a second module, the station for equipping the tube ends with nipples a third module, the station for fixing the nipples by pressing a fourth module, the station for cleaning the tube by blowing a fifth module, the station for hydrostatic tests a sixth module and the wrapping station a seventh module.

This means that the new machine becomes very flexible and can be used for different techniques in the field.

The new machine allows the tubes to be produced according to assemble line principle, which means that as soon as a tube has left one station, a nest tube comes in to this station. This means that the new invention gives a very efficient tube production.

In the text has been mentioned as an example production of a hydraulic tube. The invention, of course, also relates to productions of other types of tubes for instance air tubes and tubes being utilised in industry.

The invention is not limited to the embodiment described in the text and shown in the drawing but can be modified within the scope of the following claims.

What is claimed is:

1. A machine for automatic production of a tube which is provided with a nipple in each end, the tube primary product being rolled up on a roll, which is arranged in a tube roll stand, characterized by the combination of the following features:

the machine is controlled by a process-computer and has a plurality of machining stations, intended for the tube;

the machine comprises a measuring and cutting station, into which the tube is fed from the tube roll (3,4) and which is provided with equipment (9, 10, 16) for measuring and cutting the tube;

the machine comprises a nipple connection station, which is provided with equipment (22–26) for providing the tube with a nipple in each end;

the machine comprises a pressing station, which has a pressing unit (28) by means of which the nipples, put on the tube in the nipple connection station, are pressed to a fixed position on the tube;

the machine further comprises a station for final treatment, having equipment (32–34) for cleaning the tube by flushing/blowing and/or also equipment for hydrostatic test of the tube.

2. A machine according to claim 1, characterized in that it comprises a peeling unit (17) provided with two separate peeling means (18, 19), which are intended to peel the two ends of the tube, and of which one peeling means (18) is fixed, whereas the other peeling means is movably arranged on rails or guides (20, 21).

3. A machine according to claim 1, characterized in that the equipment for measuring the tube comprises a stop pin (9), which comprises a reference point for the tube measuring and is movable in the vertical direction to an inactive position when drawing out and measuring the tube, that the drawing out of the tube is made by a tube outdrawer (10), which is movably arranged on a guide (11) by an electric motor, and that the tube outdrawer (10) has a tongs-like means to catch hold of the tube.

4. A machine according to claim 1, characterized in that a tube carrier (12), having two separate holding means (13, 14), is provided to move the tube between the different stations, the tube carrier being able to move in the vertical direction as well as in the horizontal direction, and that one holding means (13) is fixed, whereas the other holding means (14) is movably arranged on a support (15) for adaptation to different tube lengths.

* * * * *